(12) United States Patent
Pappachan et al.

(10) Patent No.: US 10,103,872 B2
(45) Date of Patent: Oct. 16, 2018

(54) SECURING AUDIO COMMUNICATIONS

(71) Applicant: Intel Corporation, Santa Clara, CA (US)

(72) Inventors: Pradeep M. Pappachan, Hillsboro, OR (US); Reshma Lal, Hillsboro, OR (US); Rakesh A. Ughreja, Bangalore (IN); Kumar N. Dwarakanath, Folsom, CA (US); Victoria C. Moore, Phoenix, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 81 days.

(21) Appl. No.: 14/498,711

(22) Filed: Sep. 26, 2014

(65) Prior Publication Data

US 2016/0094338 A1    Mar. 31, 2016

(51) Int. Cl.
| | |
|---|---|
| *G06F 21/44* | (2013.01) |
| *H04L 9/00* | (2006.01) |
| *G06F 9/54* | (2006.01) |
| *G06F 21/83* | (2013.01) |
| *G06F 21/57* | (2013.01) |
| *G06F 21/60* | (2013.01) |
| *H04L 9/08* | (2006.01) |
| *H04L 29/06* | (2006.01) |

(52) U.S. Cl.
CPC ............... *H04L 9/00* (2013.01); *G06F 9/54* (2013.01); *G06F 21/445* (2013.01); *G06F 21/57* (2013.01); *G06F 21/606* (2013.01); *G06F 21/83* (2013.01); *H04L 9/0838* (2013.01); *H04L 63/145* (2013.01); *G06F 2221/033* (2013.01); *H04L 63/0428* (2013.01)

(58) Field of Classification Search
CPC ........ G06F 21/83; G06F 9/544; G06F 21/445; G06F 9/54; H04L 2209/127
See application file for complete search history.

(56) References Cited

U.S. PATENT DOCUMENTS

| | | | |
|---|---|---|---|
| 6,937,814 B1 * | 8/2005 | Chasen ............... | G11B 19/02 369/30.23 |
| 2003/0005285 A1 | 1/2003 | Graunke | |
| 2005/0204163 A1 | 9/2005 | Alkove et al. | |
| | | (Continued) | |

FOREIGN PATENT DOCUMENTS

KR    10-2011-0046849    5/2011

OTHER PUBLICATIONS

PCT/US2015/051543, "Notification of Transmittal of the International Search Report and the Written Opinion of the International Searching Authority, or the Declaration" dated Jan. 13, 2016, pp. 17.

(Continued)

*Primary Examiner* — Thaddeus Plecha
(74) *Attorney, Agent, or Firm* — Womble Bond Dickinson (US) LLP (57) ABSTRACT

Systems and methods include establishing a cryptographically secure communication between an application module and an audio module. The application module is configured to execute on an information-handling machine, and the audio module is coupled to the information-handling machine. The establishment of the cryptographically secure communication may be at least partially facilitated by a mutually trusted module.

19 Claims, 8 Drawing Sheets

(56) References Cited

U.S. PATENT DOCUMENTS

| | | |
|---|---|---|
| 2006/0200859 A1* | 9/2006 | England .................. G06F 21/57 726/17 |
| 2006/0233363 A1 | 10/2006 | Graunke |
| 2008/0144834 A1 | 6/2008 | Rakoff et al. |
| 2009/0037929 A1* | 2/2009 | Shimko ................ G06F 21/606 719/312 |
| 2009/0129587 A1 | 5/2009 | Zhou et al. |
| 2011/0161848 A1 | 6/2011 | Purcell et al. |
| 2011/0320823 A1 | 12/2011 | Saroiu |
| 2012/0170741 A1 | 7/2012 | Chen et al. |
| 2012/0272061 A1* | 10/2012 | Molau ................ G06F 21/6227 713/165 |
| 2013/0243186 A1* | 9/2013 | Poston, Jr. ............. G06F 3/165 380/28 |
| 2013/0246800 A1 | 9/2013 | Stewart |
| 2013/0291055 A1 | 10/2013 | Muppidi |
| 2014/0006795 A1 | 1/2014 | Han |
| 2014/0075496 A1 | 3/2014 | Prakash et al. |
| 2014/0087696 A1* | 3/2014 | Gressus .............. H04L 63/0853 455/411 |
| 2014/0123209 A1* | 5/2014 | Rajakarunanayake ...................... H04W 12/08 726/1 |
| 2014/0177839 A1* | 6/2014 | Wagner ................ H04L 9/0822 380/259 |
| 2015/0223092 A1 | 8/2015 | Schmidt |

OTHER PUBLICATIONS

PCT/US2015/051541, "Notification of Transmittal of the International Search Report and the Written Opinion of the International Searching Authority, or the Declaration" dated Feb. 17, 2016, pp. 17.

\* cited by examiner

SECURING AUDIO COMMUNICATIONS

A. RELATED APPLICATIONS

The subject matter of the present application is related to the subject matter of the following commonly assigned, co-pending application:

U.S. application Ser. No. 14/498,701, filed on Sep. 26, 2014, entitled "Securing Sensor Data" and naming PRADEEP M. PAPPACHAN and RESHMA LAL as inventors.

The above-referenced patent application is hereby incorporated by reference herein in its entirety.

B. BACKGROUND

Audio (including speech audio) is becoming increasingly important and increasingly common in the interaction between humans and computers, especially due to advances in speech recognition and the increase in voice calling through computers. Examples of applications involving audio include: telephone calls, person identification by voice, voice commands for device control, voice recognition, etc. As audio becomes more pervasive, there is a growing concern for the security of the audio data and the impact on the users' privacy.

Malware on a user's device can intercept and gain access to audio/speech communications and gain access to private telephone conversation, user voice memos, user preferences and habits, etc. Certain protections, therefore, may be needed in order to prevent unauthorized access to private audio/speech data.

C. BRIEF DESCRIPTION OF THE DRAWINGS

Other objects and advantages of the invention may become apparent upon reading the detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

D. DETAILED DESCRIPTION

Figure 1:
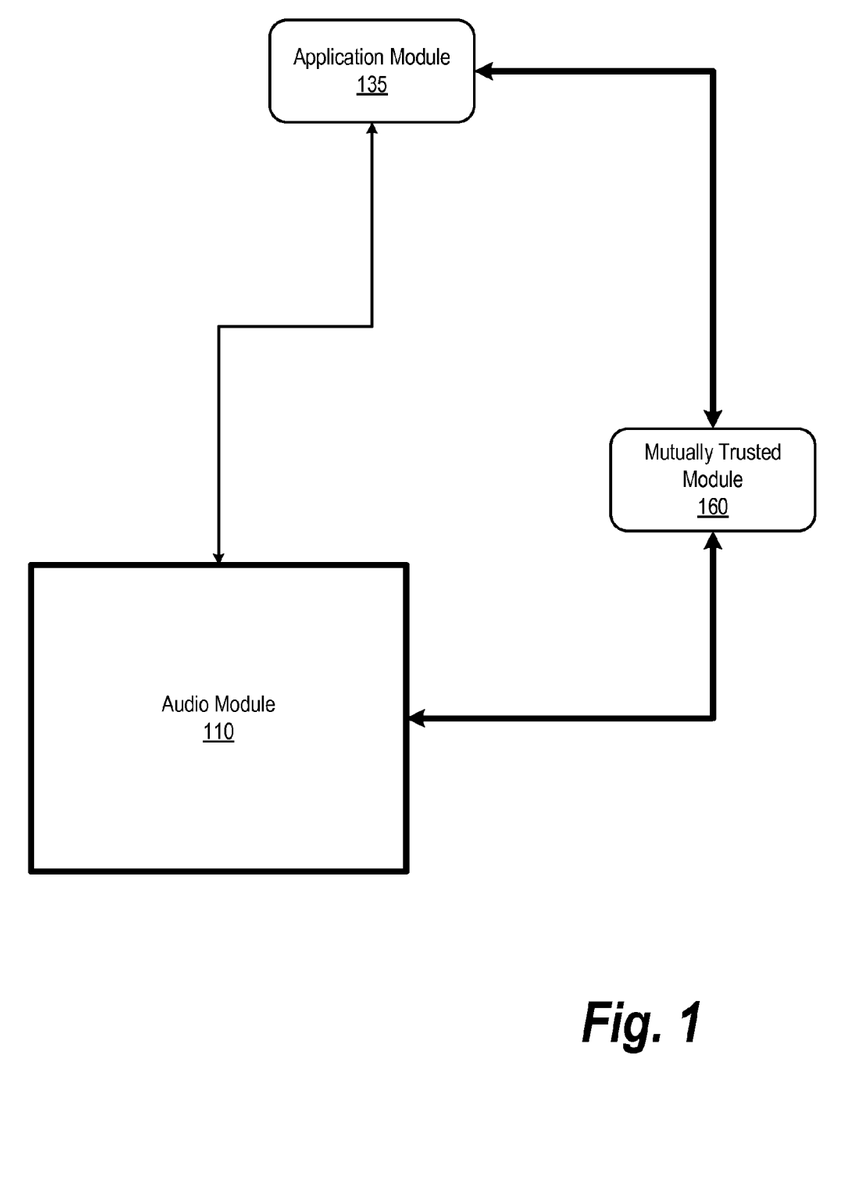
FIG. 1 is a block diagram illustrating a system configured to provide secure communications between an application module and an audio module, in accordance with some embodiments.

FIG. 1 is a block diagram illustrating a system configured to provide secure communications between an application module and an audio module, in accordance with some embodiments.

In some embodiments, audio module 110 is configured to exchange audio data with application module 135 after establishing a secure communication with the application module. In some embodiments, audio module 110 is configured to transmit audio data to application module 135 captured by one or more microphones coupled to audio module 110. In some embodiments, application module 135 is configured to transmit audio data to audio module 110, which may then be played through one or more speakers coupled to audio module 110.

In some embodiments, audio module 110 as well as application module 135 may be part of an information-handling/computational system/environment such as a personal laptop computer, a personal desktop computer, a smartphone, a specialized audio computer system, etc. Captured audio by the audio module as well as audio sent to the audio module for playback may be exposed to monitoring and capture by other applications or malware executing in the same computational environment. Audio data may generally contain private information to which access is preferably limited and controlled.

In some embodiments, mutually trusted module 160 is configured to facilitate, at least partially, the establishment of a cryptographically secure communication protocol between application module 135 and audio module 110. In some embodiments, by securing the exchange of audio data between audio module 110 and application module 135, it becomes very difficult, if not impossible, to intercept the audio data by other, unauthorized application modules, the operating system, other operating system elements, etc. As such, it is very hard, if not impossible, for malware, such as ring 0 type malware, to gain unauthorized access to the encrypted audio data exchanged between audio module 110 and application module 135.

In some embodiments, mutually trusted module 160 may be configured to determine whether application module 135 is a trusted application module prior to facilitating the establishment of encrypted communication. In some embodiments, mutually trusted module 160 may be configured to determine the trustworthiness of the application module by determining whether application module 135 is part of a trusted computational/execution environment. Other methods may also be used by mutually trusted module in order to determine a trustworthiness of application module 135.

If the application module 135 is a trusted application module, mutually trusted module 160 may then facilitate the establishment of the cryptographically secure communication between application module 135 and audio module 110. In some embodiments, mutually trusted module 160 may securely provide a secret cryptographic key to application module 135 and may securely provide the same cryptographic key to audio module 110. Application module 135 and audio module 110 may then use the secret keys to encrypt/decrypt audio and other data exchanged between them. It should be noted that various other cryptography schemes may be employed to secure the communications. Some examples of symmetric key encryption protocols that may be used include AES, Serpent, Blowfish, etc.

After establishing a cryptographically secure communication, application module 135 and audio module 110 may begin communicating securely. In some embodiments, application module 135 and audio module 110 may communicate with each other directly. In other embodiments, the two modules may communicate via mutually trusted module 160. In yet other embodiments, the two modules may communicate via a communication bus shared with one or more other modules and the operating system. Yet other modes of communication (such as wireless communication) may be used.

In some embodiments, application module 135 may also transmit a session policy to audio module. The session policy may include certain rules and conditions governing the operation of audio module 110 and application module 135. For example, the session policy may dictate whether an application module has exclusive access to the audio module. Generally, the session policy may dictate such rules/conditions as: exclusive mode operation of the audio module for the capture audio stream (for example, only one capture audio stream to the application module is allowed during the audio session). In other examples, multiple playback audio streams may be allowed; blocking of all capture audio streams that bypass the audio module and other protections put in place; encryption of capture and playback audio streams; integrity protection of capture and playback audio streams; replay protection of capture and playback audio streams, etc.

Generally, elements of a session policy can include:
sharing mode: how the audio subsystem is shared with other applications for the duration of the session. For example, in exclusive mode, only one stream is allowed access; in shared mode, multiple streams may be allowed.
stream protections: how the stream is protected. For example, does the stream need to be encrypted, integrity protected, replay protected, etc.?
cryptographic parameters for session: the encryption algorithms to use (for encryption, integrity protection, replay protection etc.), the block sizes, the encryption key sizes, etc.

In some embodiments, the encrypted audio data remains private from other software and modules executing or existing on the system. Such software and modules may include, for example, system software, the kernel, audio drivers in kernel space, audio device drivers and middleware, etc. Therefore, in some embodiments, malware—even malware that can exploit vulnerabilities in system-level software, such as ring 0 type malware—may not be able to gain access the encrypted audio data exchanged between audio module 110 and application module 135.

Figure 2:
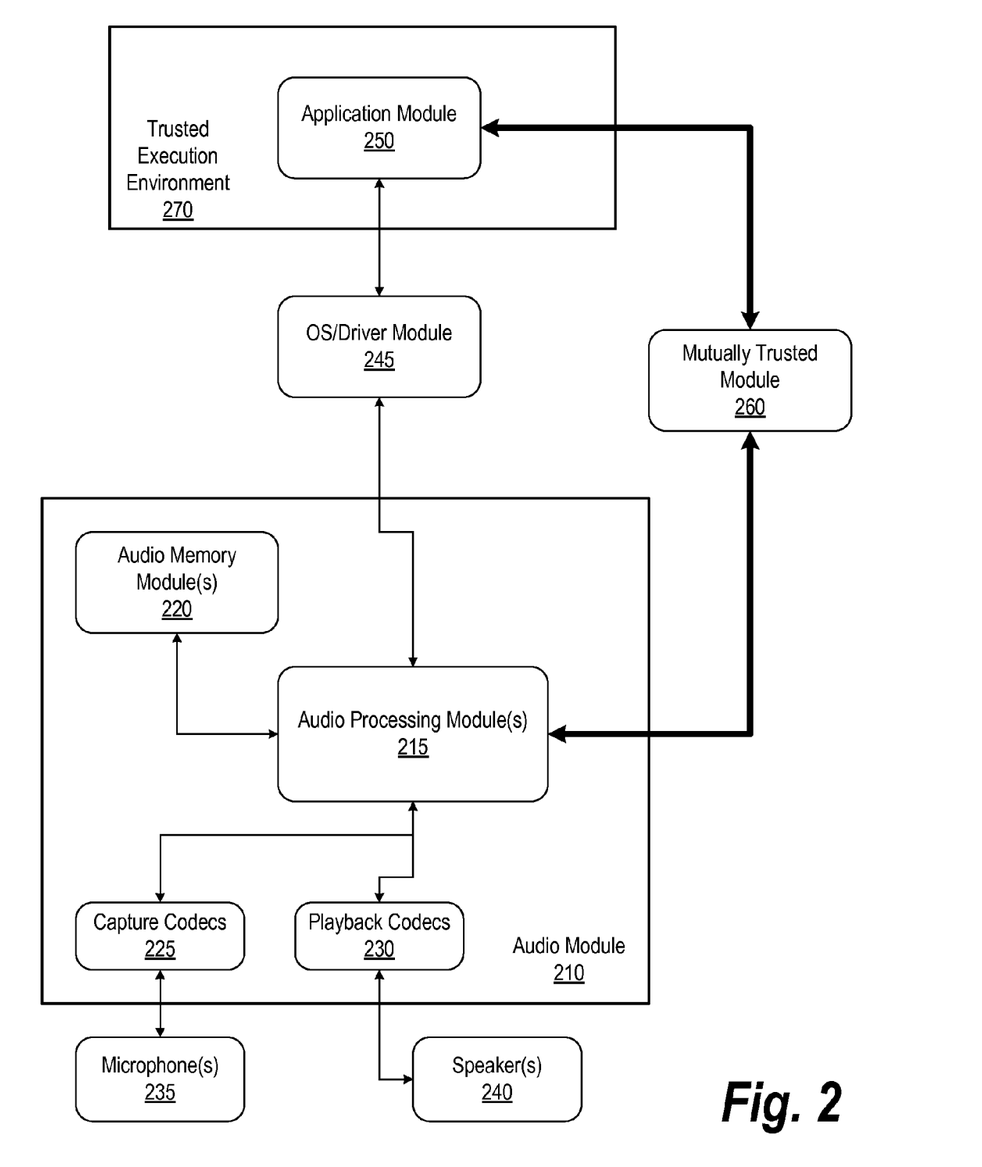
FIG. 2 is a block diagram illustrating an alternative system configured to provide secure communications between an application module and an audio module, in accordance with some embodiments.

FIG. 2 is a block diagram illustrating an alternative system configured to provide secure communications between an application module and an audio module, in accordance with some embodiments.

In some embodiments, audio module 210 is configured to exchange audio data securely with application module 250. Audio module 210 is configured to capture audio from one or more microphones 235 as well as output audio to one or more speakers 240. Audio module 210 is configured to receive audio data from application modules and the operating system and output the audio through speakers 240 after processing the audio data through playback codecs 230 and/or through audio processing modules 215. Audio module 210 is also configured to capture audio though microphones 235, process the audio data through capture codecs 225 and/or through audio processing modules 215, and transmit the audio data to one or more application modules or the operating system.

Audio module 210 may also include one or more audio processing modules 215, which are configured to perform processing as needed by audio module 210. Audio processing modules 215 may be configured, for example, to perform digital signal processing. In addition, audio processing modules 215 may be configured to perform cryptographic-related computations for securing the exchange of data between audio module 210 and application module 250.

In some embodiments, audio module 210 as well as application module 250 may be part of an information-handling/computational system environment such as a personal laptop computer, a personal desktop computer, a smartphone, a specialized audio computer system, etc. In some embodiments, the various modules/components shown in the figure may be located in multiple systems.

Captured audio by the audio module as well as audio sent to the audio module for playback may be exposed to monitoring by other applications or malware executing in the same computational environment. Audio data may generally contain private information, to which access is preferably limited and controlled.

In some embodiments, mutually trusted module 260 is configured to facilitate, at least partially, the establishment of a cryptographically secure communication between application module 250 and audio module 210. In some embodiments, mutually trusted module 260 may be configured to determine whether application module 250 is a trusted application module as a condition to establishing a secure communication between application module 250 and audio module 210. For example, in embodiments, where a trusted execution environment exists in the computational system environment, an application module may be authenticated as a trusted application module in response to determining that the application is part of the trusted execution environment. It should be noted that other methods may be to authenticate an application module as a trusted application module.

In some embodiments, audio module 210 and mutually trusted module 260 may be preprogrammed with an inherent trust for each other. For example, the two modules may be preconfigured to use memory that is not physically accessible to other modules. As such, a preconfigured, restricted access memory space is one example of how the two modules may have a private, secure way of communicating with each other. Therefore, the two modules, by this implementation, may have an inherent trust of each other.

In alternative embodiments, trust between two modules may be established by one module verifying the identity of the other module using a certificate. In some embodiments, the certificate may be issued by a mutually trusted third party that attests to the identity of the module that seeks to authenticate itself.

In response to mutually trusted module 260 determining that an application module is trusted, mutually trusted module 260 may then facilitate the establishment of a cryptographically secure communication between application module 250 and audio module 210. In some embodiments, mutually trusted module 260 may securely provide the same secret cryptographic key to application module 250 and audio module 210. In some embodiments, mutually trusted module 260 may use a different encryption protocol for the secure transmission of the secret cryptographic keys to application module 250 and audio module 210 than the encryption protocol being set up for the exchange of data between application module 250 and audio module 210.

Application module 250 and audio module 210 may then use the shared secret cryptographic key in encrypting/decrypting audio data before transmission in order to communicate securely with each other. It should be noted that various other encryption protocols may be used for securing the communication between application module 250 and audio module 210.

Trusted execution environment 270, to which application module 250 is a member, is a trusted environment for applications/application modules executing in the execution environment of the system. Various methods, modules, and systems, not described here, may be used for authenticating an application in trusted execution environment 270.

In some embodiments, application module 250 may open a secure audio data session with audio module 210 using the established cryptographically secure communication established by mutually trusted module 260. In some embodiments, the one or more audio memory modules 220 may be configured to store encryption keys and also store encrypted and decrypted audio data before/after processing, transmitting, or receiving. Audio processing modules 215 may also be configured to perform encryption/decryption operations in addition to other audio-related operations.

It should be noted that additional processing units may be used. For example, one or more processing units may be assigned to digital signal processing tasks, one or more processing units may be assigned to encryption/decryption tasks, etc. It should also be noted that one or more direct memory access units may be used to transfer data to/from audio memory modules 220 as well data to/from other memory units, such as system memory assigned to the execution environment.

In some embodiments, mutually trusted module 260 is configured to generate additional keys as needed that may be used in providing additional protection the communication between application module 250 and audio module 210. Mutually trusted module 260 may generate additional keys that may be used in protecting the integrity of the audio data being exchanged, for example. In some embodiments, mutually trusted module 260 may be configured to generate one or more message authentication codes (MACs) that may be used to authenticate and/or verify the integrity of the audio data being exchanged between application module 250 and audio module 210. In some implementations, the message authentication codes may be used to authenticate the encrypted audio data and to determine whether the audio data was altered during transmission. In addition, keys and counters may be generated for adding replay protection to the exchanged audio data.

In some embodiments, after a cryptographically secure communication is set up, application module 250 is configured to transmit an audio stream ID and a session policy to audio module 210 for the current session. The audio stream ID may be used to identify subsequent communications that are part of that session, and the session policy may be used to set up one or more rules and conditions for audio module 210.

Examples of rules/conditions that may be part of a session policy include: exclusive access to the audio module by the application module; disabling of traditional access to the audio module (by the OS/driver 245, for example); permitted mixing of audio streams; etc.

It should be noted that, in some embodiments, the enforcement of the one or more rules and conditions dictated by the session policy may be implemented by audio processing modules 215. In alternative embodiments, additional hardware (at specific communication paths, for example) may be used (or used in addition to the audio processing modules) to help enforce session policies.

In some embodiments, regardless of whether the OS/driver module 245 (or another application module and other audio middleware) intercepts the secure audio data exchanged between application module 250 and audio module 210, the secure audio data remains private.

In some embodiments, non-secure audio data received from the OS or another application module may also be routed to audio module 210 for playback. In some embodiments, the non-secure audio data may be mixed with decrypted secure audio data received from application module 250 for playback through speakers 240 assuming that such mixing does not conflict with the existing session policy.

In some embodiments, when application module 250 determines that the audio session is complete, application module 250 may send a request to mutually trusted module 260 to initiate a termination of the secure session. In response, mutually trusted module 260 may inform audio module 210 that the secure audio session with application module 250 is ending. In alternative embodiments, application module 250 may communicate the termination of the audio session directly to audio module 210.

Audio module 210 may then release any resources associated with the secure session and may then resume normal (unrestricted by an application module or session policy) operation. In some embodiments, audio module 210 may now permit access to its resources by the operating system and other non-trusted application modules.

In some embodiments, if an application module terminates abnormally while in a secure communication session with audio module 210, audio module 210 (on its own or at the request of mutually trusted module 260) may end the secure session after a timeout period, for example. For example, application module 250 may be configured to transmit a "heartbeat" signal to indicate to mutually trusted module 260 and/or to audio module 210 that the application module is still executing/functioning normally. Loss of the heartbeat signal may accordingly trigger the timeout period.

In some embodiments, more than one application module may be securely communicating with audio module 210 at a given time. For example, a first application module may set up a secure session first with audio module 210 and transmit a first session policy to audio module 210. A second application module may then attempt to set up a session with audio module 210 through mutually trusted module 260. Mutually trusted module 260 may grant the request and set up the communication if doing so is not in conflict with the first session policy, for example.

In some embodiments, audio module 210 may establish secure communications concurrently with various application modules having different requirements. For example, audio module 210 may be servicing a VoIP application that may require encrypted audio streams, and concurrently, audio module 210 may be servicing a speaker verification application that may require integrity-protected audio streams.

Figure 3:
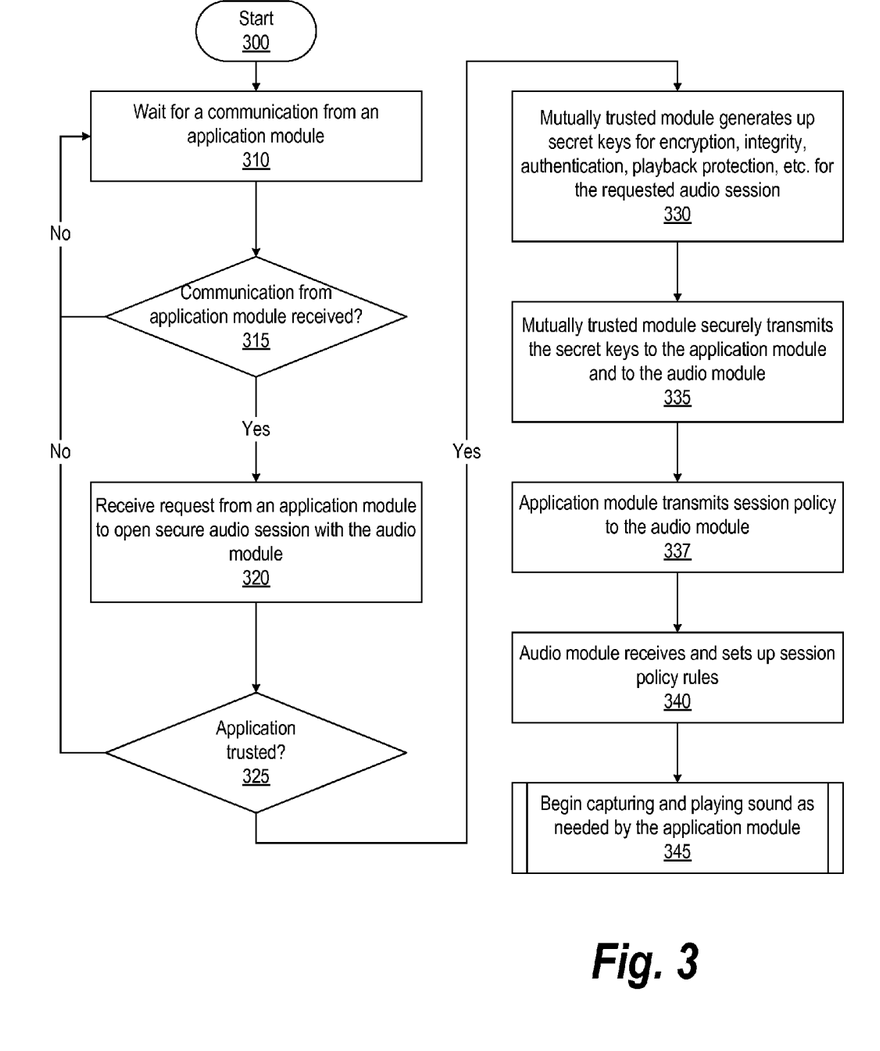
FIG. 3 is a flow diagram illustrating a method for establishing a secure communication session between an application module and an audio module, in accordance with some embodiments.

FIG. 3 is a flow diagram illustrating a method for establishing a secure communication session between an application module and an audio module, in accordance with some embodiments.

In some embodiments, the method described here may be implemented by one or more of the systems shown in FIG. 1 and FIG. 2.

In some embodiments, processing begins at 300 where, at block 310, the audio module waits for communication from an application module. In some embodiments, the communication may be direct or through a mutually trusted module. At decision 315, a determination is made as to whether communication from an application module has been received. If communication from an application module has not been received, decision 315 branches to the "no" branch where processing returns to block 310.

On the other hand, if a communication from the application module has been received, decision 315 branches to the "yes" branch where, at block 320, a request from the application module is received to open a secure audio session with the audio module. In some embodiments, the request may be received and processed by a mutually trusted module, a module that is mutually trusted by both the application module and the audio module.

A determination is then made, at decision 325, as to whether the application module is a trusted application. In some embodiments, the application module may be determined to be a trusted application module if the application module is executing within a trusted execution environment on the system. In some embodiments, this determination may be made by the mutually trusted module. If the application module is not a trusted application module, decision 325 branches to the "no" branch where processing returns to block 310.

On the other hand, if the application module is a trusted application module, decision 325 branches to the "yes" branch where, at block 330, the mutually trusted module generates secret encryption keys that are to be used by the application module and the audio module to communicate securely with each other. As needed, the mutually trusted module may also generate keys that may be used for integrity as well as replay protection of the exchanged audio data.

At block 335, mutually trusted module securely transmits the secret keys to the application module and to the audio module. It should be noted that various other security/ encryption schemes may be used to protect the exchange of audio and other data between the application module and the audio module.

At block 337, the application module securely transmits a session policy for the audio session to the audio module using the secure keys provided by the mutually trusted module. In some embodiments, the session policy may include certain rules/conditions for the audio module—such as providing exclusive access to the audio data to the application module. In addition, the audio module may transmit other relevant information, such as a session ID, for example.

At block 340, audio module receives the session policy transmitted by the application module. In response, the audio module configures certain modules that are part of the audio module as needed in order to enforce the session policy.

At block 345, the audio module begins capturing and/or playing sound as needed by the application module. In some embodiments, the audio module may capture audio using one or more microphones, encrypt the audio data using the provided encryption key (s), and securely transmit the audio data to the application module. The application module may then decrypt the audio data and use it as needed. In some embodiments, the application module may encrypt audio data that is to be played through one or more speakers using the provided encryption key(s). The audio module may then decrypt the received audio data, process the audio data as needed, and direct and the audio data to one or more speakers attached to the audio module.

Figure 4:
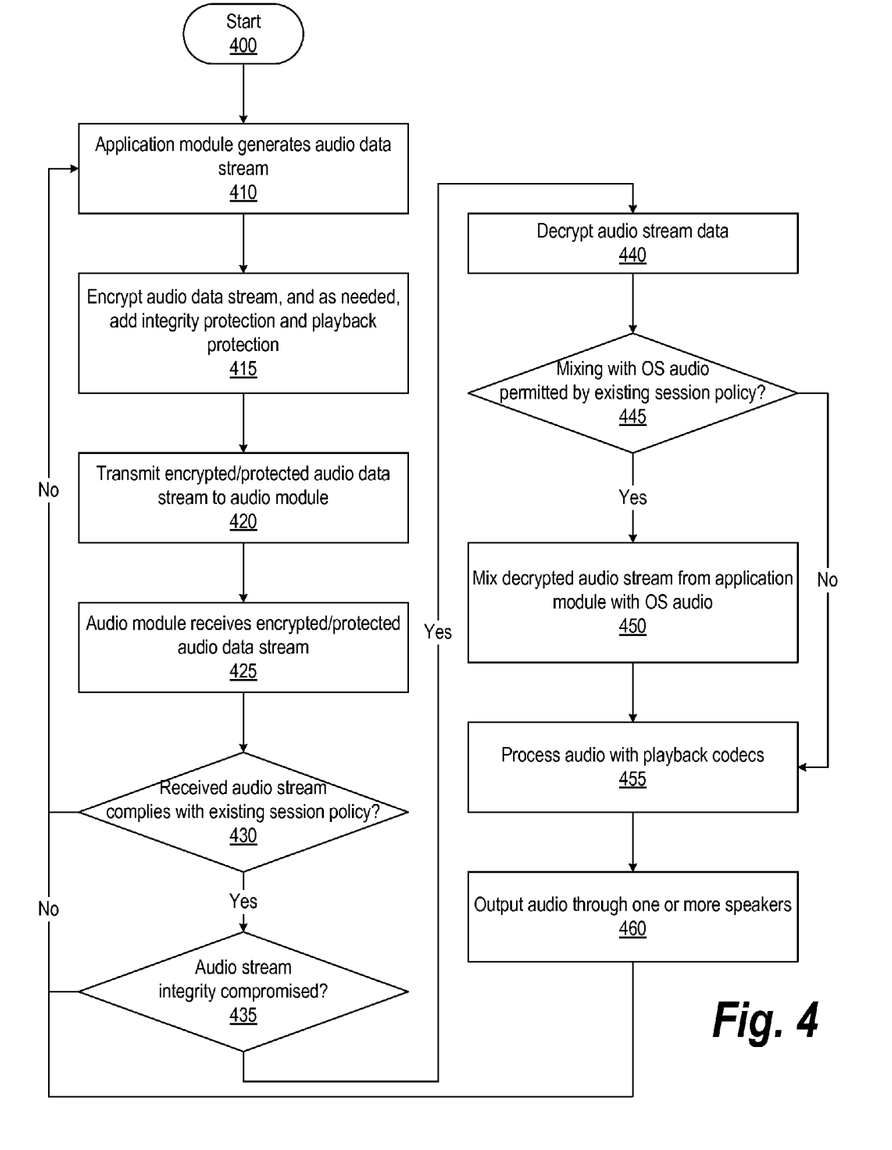
FIG. 4 is a flow diagram illustrating a method for securely transmitting audio data from an application module to an audio module, in accordance with some embodiments.

FIG. 4 is a flow diagram illustrating a method for securely transmitting audio data from an application module to an audio module, in accordance with some embodiments.

In some embodiments, the method described here may be implemented by one or more of the systems shown in FIG. 1 and FIG. 2. In some embodiments, the flow diagram in this figure may represent in more detail at least part of the functionality represented in block 345 of FIG. 3.

Processing begins at 410 where, at block 410, the application module generates an audio data stream that is to be played through one or more speakers. At block 415, the audio stream data is encrypted, and as needed, integrity protected and replay protected.

At block 420, and the encrypted/protected audio data stream is transmitted to the audio module, and block 425, the audio module receives the encrypted/protected audio data stream.

At decision 430, a determination is made as to whether the received audio stream complies with an existing session policy at the audio module. The existing session policy, for example, may have been set up with exclusive access to the audio module by a specific application module. Thus, a request from a different application module would not comply with the existing session policy.

If the received audio stream does not comply with the existing session policy, decision 430 branches to the "no" branch where processing returns to block 410. For example, a first application module may set up exclusive access to the audio module through a first session policy. Accordingly, a request for access by a second application module may violate the existing session policy and may be denied access.

On the other hand, if the received audio stream does comply with the existing session policy, decision 430 branches to the "yes" branch where, at decision 435, another determination is made as to whether the audio stream integrity is compromised. If the audio stream integrity has been compromised, decision 435 branches to the "no" branch where processing again returns to block 410. In addition, a notification may be sent to the application module indicating that the audio stream was compromised during transmission.

On the other hand, if the audio stream integrity has not been compromised, decision 435 branches to the "yes" branch where, at block 440, the audio module decrypts the audio stream data received from the application module.

Another determination is then made, at decision 445, as to whether mixing audio from the application module with audio from the operating system is permitted by the existing session policy. Audio from the operating system may include, for example, system notification sounds, etc. If the mixing is not permitted, decision 445 branches to the "no" branch and processing bypasses block 450 and jumps to block 455.

On the other hand, If the current session policy permits mixing audio from the audio module with the operating system audio, decision 445 branches to the "yes" branch where, at block 450, the decrypted audio stream from the audio module is mixed with audio from the operating system.

At block 455, the audio is processed using playback codecs, and at block 460, audio is output through one or more speakers that are coupled to the audio module. Processing subsequently returns to block 410.

Figure 5:
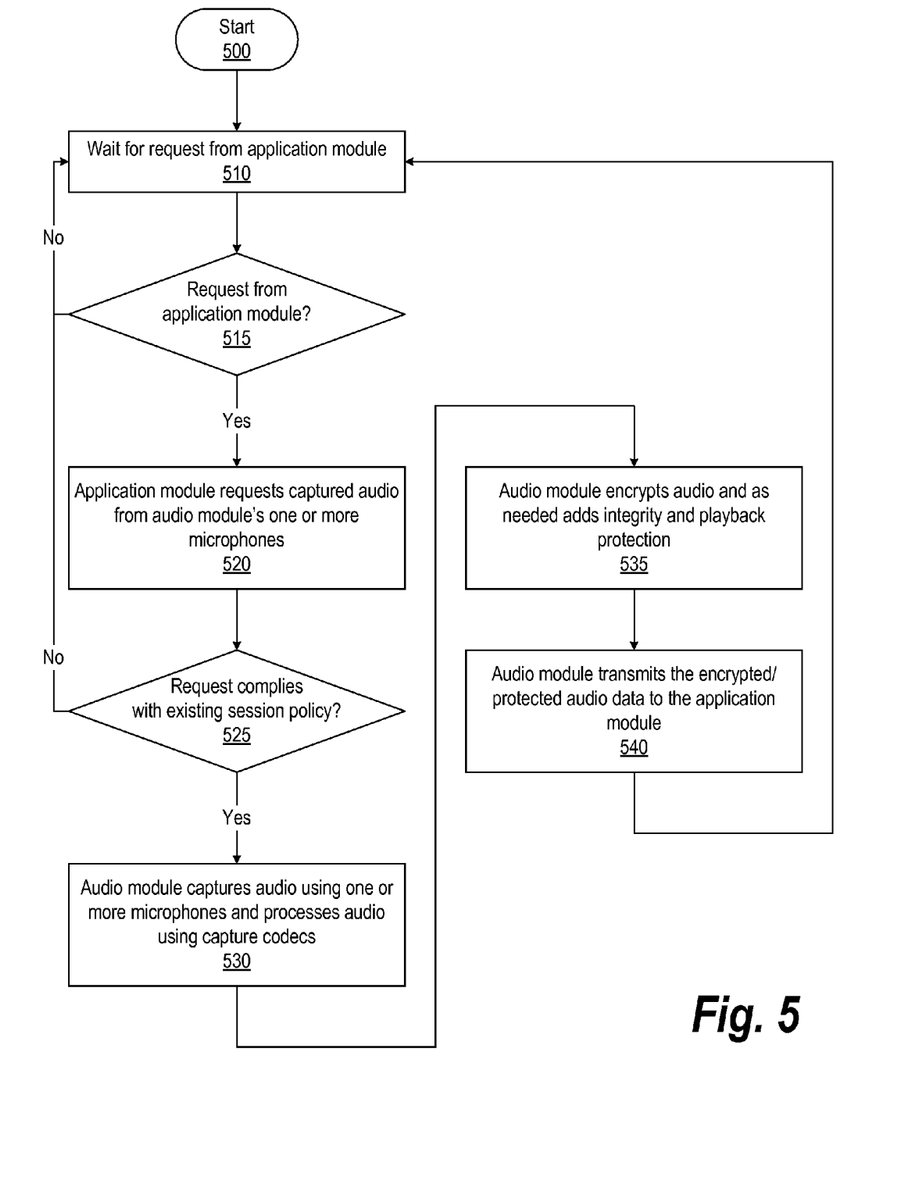
FIG. 5 is a flow diagram illustrating a method for securely transmitting captured audio data from an audio module to an application module, in accordance with some embodiments.

FIG. 5 is a flow diagram illustrating a method for securely transmitting captured audio data from an audio module to an application module, in accordance with some embodiments.

In some embodiments, the method described here may be implemented by one or more of the systems shown in FIG. 1 and FIG. 2. In some embodiments, the flow diagram in this figure may represent in more detail at least part of the functionality represented in block 345 of FIG. 3.

At block 510, the audio module waits for a request from an application module. At decision 515, a determination is made as to whether a request from the application module has been received. If no request has been received from the application module, decision 515 branches to the "no" branch where processing loops back to block 510. It should be noted that, in some embodiments, the request may be received through a mutually trusted module. On the other hand, if a request has been received from an application module, decision 515 branches to the "yes" branch where, at block 520, the application module requests to capture audio from the audio module's one or more microphones.

Another determination is then made, at decision 525, as to whether the request from the application module complies with an existing session policy. If the request does not comply with the existing session policy, decision 525 branches to "no" branch where processing again loops back to block 510. For example, a first application module may set up exclusive access to the audio module through a first session policy. Accordingly, a request for access by a second application module may violate the existing session policy and thus may be denied access.

On the other hand, if the request does comply with the existing session policy, decision 525 branches to the "yes" branch where, at block 530, the audio module captures audio using one or more microphones. In some embodiments, the audio module may also process the audio using capture codecs.

At block 535, the audio module encrypts the audio data. In addition and as needed, the audio module may add integrity and replay protection to the audio stream.

At block 540, the audio module transmits the encrypted/protected audio data stream to the application module. Processing subsequently returns to block 510.

Figure 6:
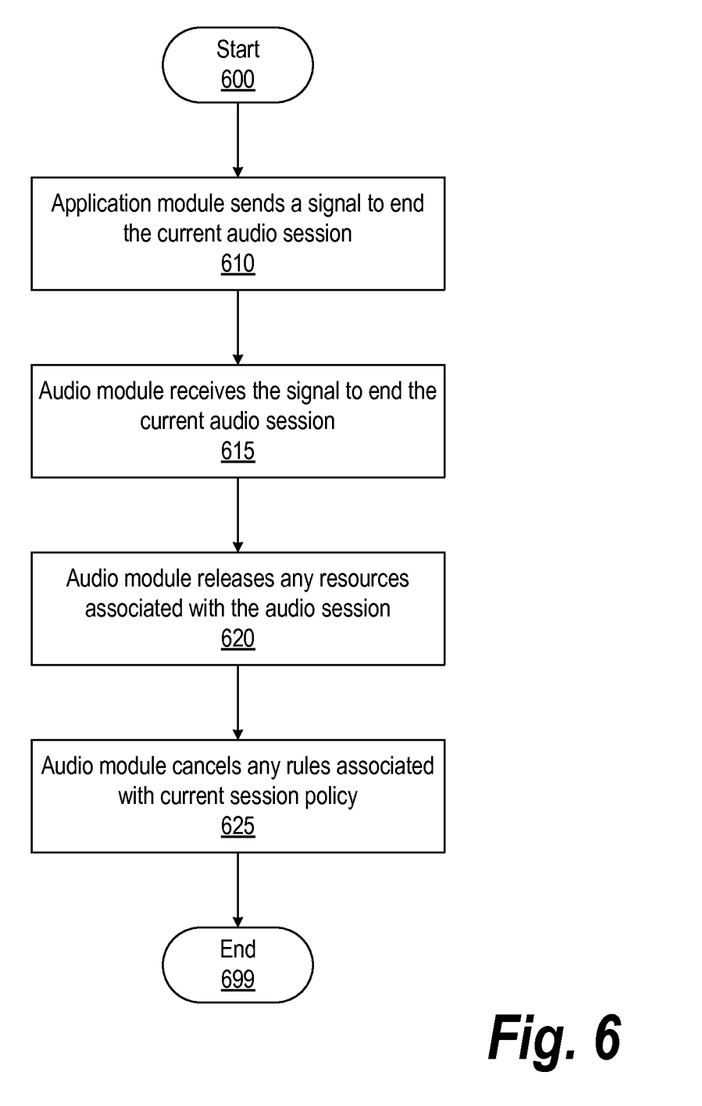
FIG. 6 is a flow diagram illustrating a method for terminating a secure audio session between an application module and an audio module, in accordance with some embodiments.

FIG. 6 is a flow diagram illustrating a method for terminating a secure audio session between an application module and an audio module, in accordance with some embodiments.

In some embodiments, the method described here may be implemented by one or more of the systems shown in FIG. 1 and FIG. 2.

Processing begins at 600 where, at block 610, the application module sends a signal indicating the end of the current audio session, and at block 615, the audio module receives the signal from the application module to end the current audio session. In some embodiments, the application module may communicate the end of the audio session to the audio module through a mutually trusted module.

At block 620, the audio module releases any resources associated with the audio session, and at block at block 625, the audio module cancels any rules/conditions that were put in place as part of the current session policy that was imposed by the application module. In some embodiments, the audio module may now return to normal, non-secure operation until another application module requests a new secure audio session.

Processing subsequently ends at 699.

Figure 7:
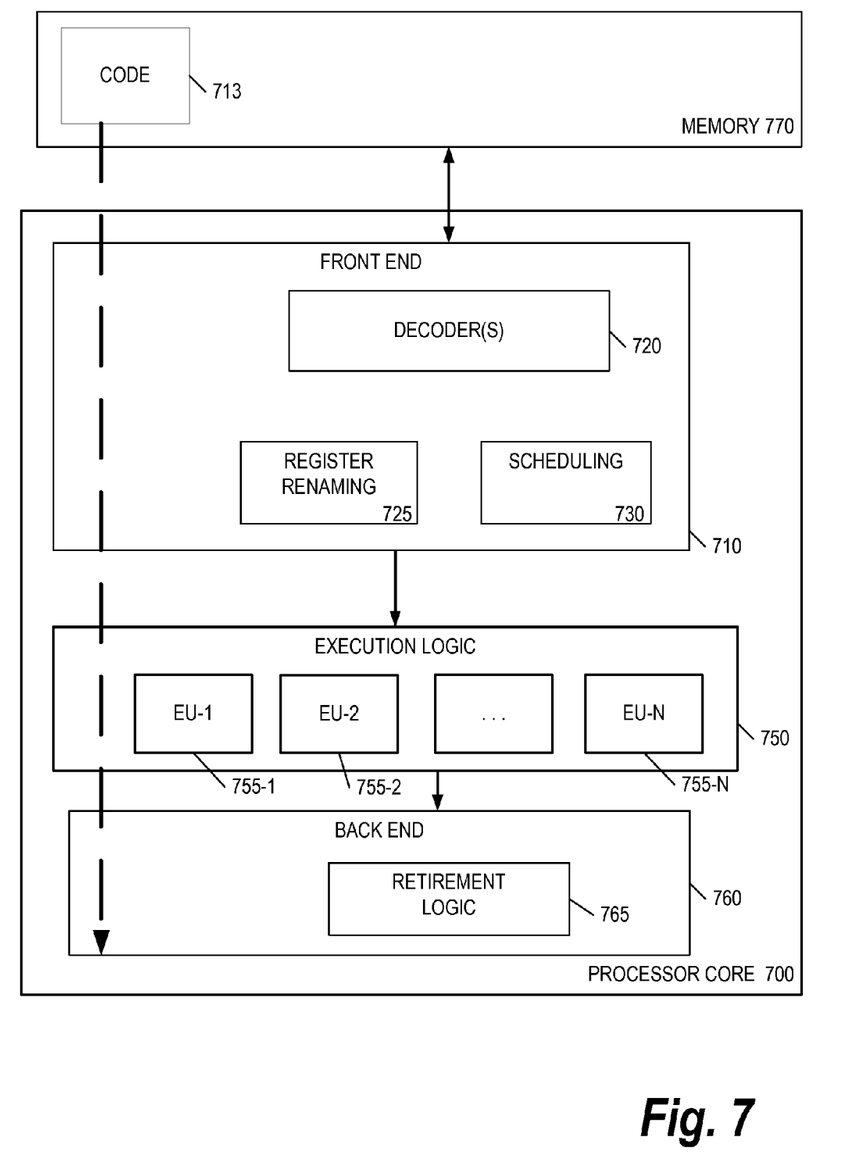
FIG. 7 is a block diagram illustrating a processor, in accordance with some embodiments.

FIG. 7 is a block diagram illustrating a processor, in accordance with some embodiments.

FIG. 7 illustrates a processor core 700 according to one embodiment. Processor core 700 may be the core for any type of processor, such as a micro-processor, an embedded processor, a digital signal processor (DSP), a network processor, or other device to execute code. Although only one processor core 700 is illustrated in FIG. 7, a processing element may alternatively include more than one of the processor core 700 illustrated in FIG. 7. Processor core 700 may be a single-threaded core or, for at least one embodiment, the processor core 700 may be multithreaded in that it may include more than one hardware thread context (or "logical processor") per core.

FIG. 7 also illustrates a memory 770 coupled to the processor 700. The memory 770 may be any of a wide variety of memories (including various layers of memory hierarchy) as are known or otherwise available to those of skill in the art. The memory 770 may include one or more code instruction(s) 713 to be executed by the processor 700 core. The processor core 700 follows a program sequence of instructions indicated by the code 713. Each instruction enters a front-end portion 710 and is processed by one or more decoders 720. The decoder may generate as its output a micro operation such as a fixed width micro operation in a predefined format, or may generate other instructions, microinstructions, or control signals, which reflect the original code instruction. The front end 710 also includes register renaming logic 725 and scheduling logic 730, which generally allocate resources and queue the operation corresponding to the convert instruction for execution.

The processor 700 is shown including execution logic 750 having a set of execution units 755-1, 755-2, through 755-N. Some embodiments may include a number of execution units dedicated to specific functions or sets of functions. Other embodiments may include only one execution unit or one execution unit that can perform a particular function. The execution logic 750 performs the operations specified by code instructions. After completion of execution of the operations specified by the code instructions, back end logic 760 retires the instructions of the code 713. In one embodiment, the processor 700 allows out of order execution but requires in order retirement of instructions. Retirement logic 765 may take a variety of forms as known to those of skill in the art (e.g., re-order buffers or the like). In this manner, the processor core 700 is transformed during execution of the code 713, at least in terms of the output generated by the decoder, the hardware registers and tables utilized by the register renaming logic 725, and any registers (not shown) modified by the execution logic 750.

Although not illustrated in FIG. 7, a processing element may include other elements on chip with the processor core 700. For example, a processing element may include memory control along with the processor core 700. The processing element may include I/O control logic and/or may include I/O control logic integrated with memory control logic. The processing element may also include one or more caches.

In some embodiments, code 713 may be configured to facilitate, at least partially, the establishment of a cryptographically secure communication between an application module and an audio module. In some embodiments, the application module may be executing in a secure environment. In some embodiments, code 713 may be suitable to cause the transformation of registers or memory elements that correspond to the establishment of the cryptographically secure communication between an application module and an audio module.

Figure 8:
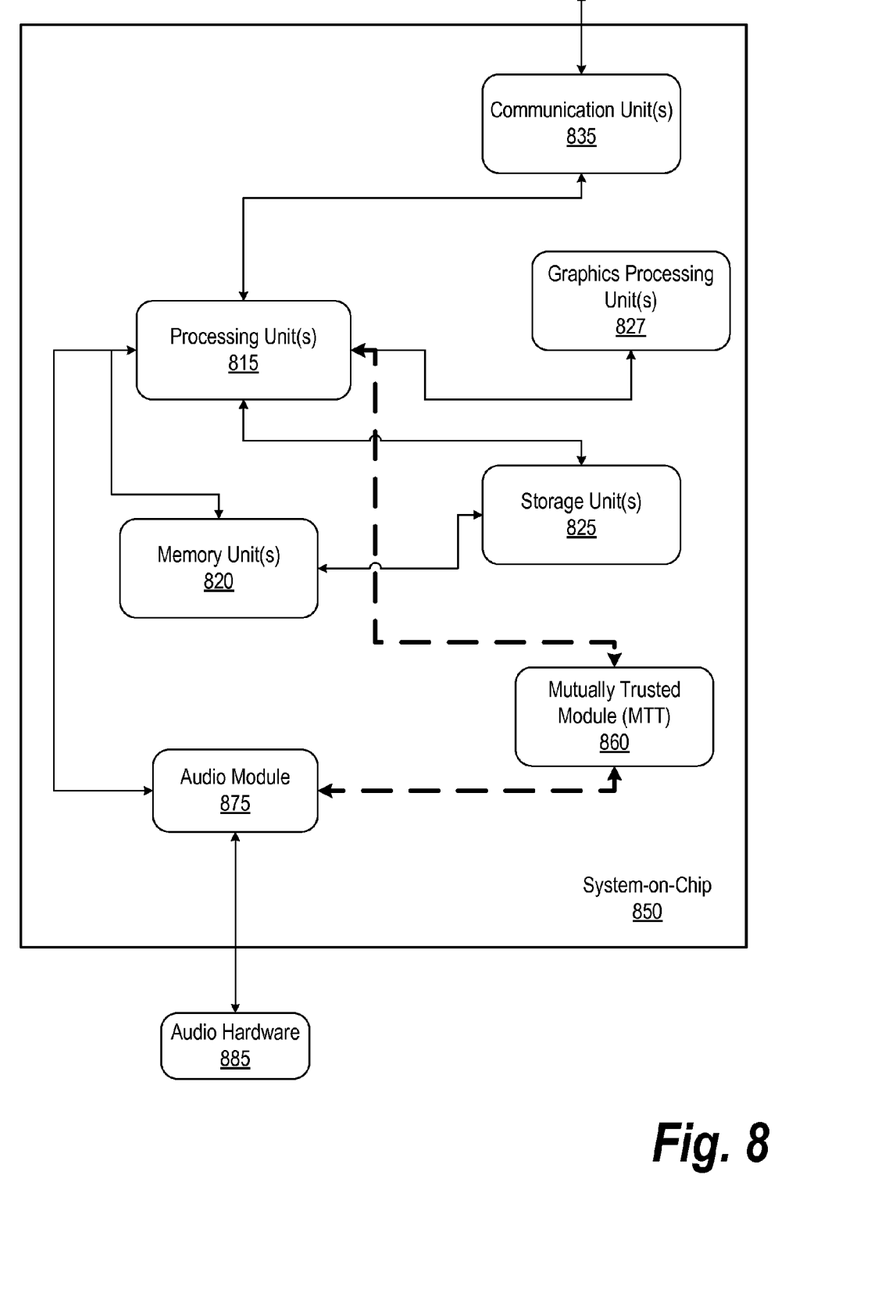
FIG. 8 is a block diagram illustrating a system, including a system-on-chip, configured to provide secure audio communications between an application module and an audio module, in accordance with some embodiments.

FIG. 8 is a block diagram illustrating a system, including a system-on-chip, configured to provide secure audio communications between an application module and an audio module, in accordance with some embodiments.

In some embodiments, system-on-chip 850 is another example of a system configured to, at least partially, establish a cryptographically secure communication between an application executing in the system and audio module 875. Audio module 875 may be configured to send audio to audio hardware 885 for playback (through one or more speakers in audio hardware 885) and receive audio captured by audio hardware 885 (by one or more microphones in audio hardware 885).

It should be noted one or more additional components/units may be included in system-on-chip 850 and one or more of the components shown here may not be present in the system-on-chip 850. In addition, it should be noted that one or more of the components may be implemented in hardware, firmware, software or a combination of those. Furthermore, it should be noted that each of the one or more components may be implemented by one or more other units.

System-on-chip 850, which may be generally designed as a single integrated circuit package. In some implementations, system-on-chip 850 may be fabricated on a single semiconductor wafer substrate. In various examples, system-on-chip 850 may be constructed using various SOC designs and manufacturing methods to create effectively a small computing system. Among other units, system-on-chip 850 may include processing units 815, memory units 820, storage units 825, graphics processing units 827, and communication units 835. It should be noted that in other implementations, one or more of the various devices and modules in system-on-chip 850 may be fabricated on separate semiconductor wafer substrates.

Additionally, coupled to system-on-chip 850 may be one or more cameras for capturing images/video, one or more microphones for capturing audio, one or more antennas for facilitating electromagnetic transmission/reception for communication, one or more speakers for outputting audio, one more touchscreens for outputting images/video and receiving user input, and one or more keyboards and mice for receiving user input. Furthermore, coupled to system-on-chip 850 may be one or more sensors such as location sensors, proximity sensors, light sensors, accelerometers, magnetic sensors, pressure sensors, temperature sensors, biometric security sensors, etc.

In some embodiments, instructions/software code may be stored in a combination of non-volatile/volatile memory such as storage units 825 and memory units 820. The instructions may be configured to be processed by processor 815 in order to facilitate at least some of the functionality of system-on-chip 850, such as facilitating, at least partially, the establishment of a secure communication between audio module 815 and application module. In yet other embodiments, at least some of the processing described above may be performed by mutually trusted module 860.

In some embodiments, system-on-chip 850 may be a portable device, such as a mobile phone, a smartphone with a touchscreen, a tablet, a laptop, a hybrid device, another communication device, etc.

Example 1 may include an information-handling system that includes an audio module, an application module configured to execute on the information-handling system, and a mutually trusted module coupled to the audio module and to the application module. The mutually trusted module may be configured to facilitate, at least partially, an establishment of a cryptographically secure communication between the application module and the audio module.

Example 2 may include the system of example 1, with the mutually trusted module configured to facilitate being based at least upon the mutually trusted module verifying a trustworthiness of the application module.

Example 3 may include the system of example 2, with the mutually trusted module verifying a trustworthiness of the application module being based at least upon the mutually trusted module determining that the application module is executing in a trusted execution environment.

Example 4 may include the system of example 1 or 2, with the mutually trusted module being configured to trust the audio module and the audio module being configured to trust the mutually trusted module.

Example 5 may include the system of example 1 or 2 or 4, with the mutually trusted module being configured to facilitate, at least partially, the exchange of one or more cryptographic keys between the application module and the audio module.

Example 6 may include the system of example 1 or 2 or 4, and may also include the application module transmitting to the audio module a session policy based at least upon the establishing the cryptographically secure communication, and where the audio module is configured to enforce the session policy.

Example 7 may include the system of example 6, and may also include: receiving a request from another application module for establishing another cryptographically secure communication between the other application module and the audio module; the mutually trusted module establishing another cryptographically secure communication and facilitating the exchange of one or more other cryptographic keys between the other application module and the audio module based at least upon determining that the other application module is a trusted application module, and determining that the request is in agreement with the session policy.

Example 8 may include the system of example 1 or 2 or 4, where, based at least upon establishing the cryptographically secure communication, the audio module is configured to capture audio through one or more microphones, encrypt the audio using the established cryptographically secure communication, and transmit the encrypted audio to the application module, and receive encrypted audio from the application module, decrypt the audio using the established cryptographically secure communication, and play the audio through one or more speakers. The application module is configured to receive encrypted audio from the audio module, decrypt the audio using the established cryptographically secure communication, and process the decrypted audio, and process audio, encrypt the audio using the established cryptographically secure communication, and transmit the encrypted audio to the audio module for playback.

Example 9 may include a method for securely exchanging information, including establishing a cryptographically secure communication between an application module and an audio module. The application module is executing on an information-handling machine and the audio module is coupled to the information-handling machine. Establishing is at least partially facilitated by a mutually trusted module.

Example 10 may include the method of example 9, where the mutually trusted module facilitating the establishing is based at least upon the mutually trusted module being configured to verify a trustworthiness of the application module.

Example 11 may include the method of example 10, where the mutually trusted module verifying a trustworthiness of the application module is based at least upon the mutually trusted module determining that the application module is executing in a trusted execution environment.

Example 12 may include the method of example 9 or 10, where the mutually trusted module is configured to trust the audio module and the audio module is configured to trust the mutually trusted module.

Example 13 may include the method of example 9 or 10 or 12, where the mutually trusted module is configured to facilitate, at least partially, the exchange of one or more cryptographic keys between the application module and the audio module.

Example 14 may include the method of example 9 or 10 or 12, including the application module transmitting to the audio module a session policy based at least upon the establishing the cryptographically secure communication, and where the audio module is configured to enforce the session policy.

Example 15 may include the method of example 14, including receiving a request from another application module for establishing another cryptographically secure communication between the other application module and the audio module. The mutually trusted module establishing another cryptographically secure communication and facilitating the exchange of one or more other cryptographic keys between the other application module and the audio module based at least upon determining that the other application module is a trusted application module, and determining that the request is in agreement with the session policy.

Example 16 may include the method of example 9 or 10 or 12, where, based at least upon establishing the cryptographically secure communication the audio module is configured to capture audio through one or more microphones, encrypt the audio using the established cryptographically secure communication, and transmit the encrypted audio to the application module, and receive encrypted audio from the application module, decrypt the audio using the established cryptographically secure communication, and play the audio through one or more speakers. The application module is configured to receive encrypted audio from the audio module, decrypt the audio using the established cryptographically secure communication, and process the decrypted audio, and process audio, encrypt the audio using the established cryptographically secure communication, and transmit the encrypted audio to the audio module for playback.

Example 17 may include at least one non-transitory, machine-accessible storage medium having instructions stored thereon, where the instructions are configured, when executed on a machine, to cause the machine to establish a cryptographically secure communication between an application module and an audio module. The application module is executing on an information-handling machine.

Example 18 may include the at least one storage medium of example 17, where the instructions are configured to cause the machine to verify a trustworthiness of the application module.

Example 19 may include the at least one storage medium of example 18, where the instructions being configured to cause the machine to verify a trustworthiness of the application module based at least upon determining that the application module is executing in a trusted execution environment.

Example 20 may include the at least one storage medium of example 17 or 18 or 20, where the instructions are configured to cause the machine to facilitate, at least partially, the exchange of one or more cryptographic keys between the application module and the audio module.

Example 21 may include the at least one storage medium of example 17 or 18 or 20, including the application module transmitting to the audio module a session policy based at least upon the establishing the cryptographically secure communication, and where the audio module is configured to enforce the session policy.

Example 22 may include the at least one storage medium of example 21, including the instructions being configured to receive and process a request from another application module for establishing another cryptographically secure communication between the other application module and the audio module. The instructions are configured to cause the machine to establish another cryptographically secure communication and facilitate the exchange of one or more other cryptographic keys between the other application module and the audio module based at least upon determining that the other application module is a trusted application module, and determining that the request is in agreement with the session policy.

Example 23 may include the at least one storage medium of example 17 or 18, where, based at least upon establishing the cryptographically secure communication the audio module is configured to capture audio through one or more microphones, encrypt the audio using the established cryptographically secure communication, and transmit the encrypted audio to the application module, and receive encrypted audio from the application module, decrypt the audio using the established cryptographically secure communication, and play the audio through one or more speakers. The application module is configured to receive encrypted audio from the audio module, decrypt the audio using the established cryptographically secure communication, and process the decrypted audio, and process audio, encrypt the audio using the established cryptographically secure communication, and transmit the encrypted audio to the audio module for playback.

Example 24 may include an apparatus configured to securely exchange information, including means for facilitating, at least partially, an establishment of a cryptographically secure communication between an application module and an audio module. The application module is executing on an information-handling machine and the audio module is coupled to the information-handling machine.

Example 25 may include the apparatus of example 24, including means for verifying a trustworthiness of the application module.

Example 26 may include the apparatus of example 25, including means for determining that the application module is executing in a trusted execution environment.

Example 27 may include the apparatus of example 24 or 25, including means for facilitating, at least partially, the exchange of one or more cryptographic keys between the application module and the audio module.

Example 28 may include the apparatus of example 24 or 25, including means for transmitting to the audio module a session policy based at least upon the establishing the cryptographically secure communication, and where the audio module is configured to enforce the session policy.

Example 29 may include a mutually trusted module comprising one or more processors and one or more memory units coupled to the one or more processors. The mutually trusted module is configured to facilitate, at least partially, an establishment of a cryptographically secure communication between an application module and an audio module. The application module is configured to execute on an information handling system and be coupled to the mutually trusted module. The audio module is configured to be coupled to the mutually trusted module.

Example 30 may include the mutually trusted module of claim 29, where the mutually trusted module facilitating is based at least upon the mutually trusted module being configured to verify a trustworthiness of the application module.

Example 31 may include the mutually trusted module of claim 30, where the mutually trusted module verifying a trustworthiness of the application module is based at least upon the mutually trusted module being configured to determine that the application module is executing in a trusted execution environment.

Example 32 may include the mutually trusted module of claim 29 or 30, where the mutually trusted module is configured to trust the audio module and the audio module is configured to trust the mutually trusted module.

Example 33 may include the mutually trusted module of claim 29 or 30 or 32, where the mutually trusted module is configured to facilitate, at least partially, the exchange of one or more cryptographic keys between the application module and the audio module.

Example 34 may include the mutually trusted module of claim 29 or 30 or 32, comprising the application module being configured to transmit to the audio module a session policy based at least upon the establishing the cryptographically secure communication, and wherein the audio module is configured to enforce the session policy.

Example 35 may include the mutually trusted module of claim 34, being further configured to receive a request from another application module for establishing another cryptographically secure communication between the other application module and the audio module. In addition, the mutually trusted module is configured to establish another cryptographically secure communication and to facilitate the exchange of one or more other cryptographic keys between the other application module and the audio module based at least upon determining that the other application module is a trusted application module, and determining that the request is in agreement with the session policy.

Example 36 may include the mutually trusted module of claim 29 or 30 or 32, where, based at least upon establishing the cryptographically secure communication the audio module is configured to capture audio through one or more microphones, encrypt the audio using the established cryptographically secure communication, and transmit the encrypted audio to the application module, and receive encrypted audio from the application module, decrypt the audio using the established cryptographically secure communication, and play the audio through one or more speakers. The application module is configured to receive encrypted audio from the audio module, decrypt the audio using the established cryptographically secure communication, and process the decrypted audio, and process audio, encrypt the audio using the established cryptographically secure communication, and transmit the encrypted audio to the audio module for playback.

Example 37 may include an audio module comprising one or more processors and one or more memory units coupled to the one or more processors. The audio module is configured to couple to a mutually trusted module. The mutually trusted module is configured to facilitate, at least partially, an establishment of a cryptographically secure communication between an application module configured to execute on an information handling system and the audio module.

Example 38 may include the audio module of claim 37, where the mutually trusted module facilitating is based at least upon the mutually trusted module being configured to verify a trustworthiness of the application module.

Example 39 may include the audio module of claim 38, where the mutually trusted module verifying a trustworthiness of the application module is based at least upon the mutually trusted module being configured to determine that the application module is executing in a trusted execution environment.

Example 40 may include the audio module of claim 37 or 38, where the mutually trusted module is configured to trust the audio module and the audio module is configured to trust the mutually trusted module.

Example 41 may include the audio module of claim 37 or 38 or 40, wherein the mutually trusted module is configured to facilitate, at least partially, the exchange of one or more cryptographic keys between the application module and the audio module.

Example 42 may include the audio module of claim 37 or 38 or 40, comprising the application module being configured to transmit to the audio module a session policy based at least upon the establishing the cryptographically secure communication, and where the audio module is configured to enforce the session policy.

Example 43 may include the audio module of claim 42, where the mutually trusted module is further configured to receive a request from another application module for establishing another cryptographically secure communication between the other application module and the audio module. In addition, the mutually trusted module is configured to establish another cryptographically secure communication and to facilitate the exchange of one or more other cryptographic keys between the other application module and the audio module based at least upon determining that the other application module is a trusted application module, and determining that the request is in agreement with the session policy.

Example 44 may include the audio module of claim 37 or 38 or 40, wherein, based at least upon establishing the cryptographically secure communication the audio module is configured to capture audio through one or more microphones, encrypt the audio using the established cryptographically secure communication, and transmit the encrypted audio to the application module, and receive encrypted audio from the application module, decrypt the audio using the established cryptographically secure communication, and play the audio through one or more speakers. The application module is configured to receive encrypted audio from the audio module, decrypt the audio using the established cryptographically secure communication, and process the decrypted audio, and process audio, encrypt the audio using the established cryptographically secure communication, and transmit the encrypted audio to the audio module for playback.

One or more embodiments of the invention are described above. It should be noted that these and any other embodiments are exemplary and are intended to be illustrative of the invention rather than limiting. While the invention is widely applicable to various types of systems, a skilled person will recognize that it is impossible to include all of the possible embodiments and contexts of the invention in this disclosure. Upon reading this disclosure, many alternative embodiments of the present invention will be apparent to persons of ordinary skill in the art.

Those of skill will appreciate that the various illustrative logical blocks, modules, circuits, and steps described in connection with the embodiments disclosed herein may be implemented as hardware, firmware, software, or combinations of those. To illustrate clearly this interchangeability of hardware, firmware, and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations that follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A data processing system comprising:
a data processing device having a hardware processor to facilitate:
an application module to transmit a session policy to an audio module based on cryptographically secured communication with the audio module, wherein the session policy to dictate parameters of operations of and communication between the application module and the audio module, wherein the session policy is further to secure a preconfigured memory space to be shared exclusively by the application module and the audio module, wherein the session policy is further to exclude other modules or components of the system from accessing data being communicated between the preconfigured memory space being shared by the application module and the audio module,
wherein the session policy is further to define one or more of integrity parameters, cryptography parameters, and replay parameters,
wherein the other modules or components include one or more of an operating system, system software, kernels, drivers, and middleware;
the audio module to capture audio through one or more microphones, encrypt the audio in accordance with the session policy, and transmit the encrypted audio to the application module in compliance with the cryptographically secured communication; and
a mutually trusted module coupled to the audio module and the application module, wherein the mutually trusted module facilitates, at least partially, establishment of the cryptographically secured communication between the application module and the audio module.

2. The system of claim 1, wherein the mutually trusted module is further to verify trustworthiness of the application module based on whether the application module is executing in a trusted execution environment.

3. The system of claim 1, wherein the mutually trusted module trusts the audio module, wherein the audio module trusts the mutually trusted module.

4. The system of claim 1, wherein the mutually trusted module facilitates, at least partially, exchange of one or more cryptographic keys between the application module and the audio module.

5. The system of claim 1, wherein the application module is further to receive the encrypted audio from the audio module, decrypt the audio in accordance with the session policy, and process the decrypted audio.

6. The system of claim 1, wherein the session policy comprises one or more cryptographic policy rules to govern encryption and decryption of the audio communicated between the audio module and the application module, wherein the cryptographic policy rules are further to ensure one or more of secrecy, integrity, authentication, and playback protection of the audio, wherein a request for establishing the cryptographically secured communication between the audio module and the application module includes determining that the request is in agreement with the session policy.

7. The system of claim 1, wherein the mutually trusted module is further to securely transmit one or more secret keys in support of the session policy to the application module and the audio module.

8. A method comprising:
establishing, by a computing device, cryptographically secured communication between an application module and an audio module of the computing device, wherein a session policy to dictate parameters of operations of and communication between the application module and the audio module, wherein the session policy is further to secure a preconfigured memory space to be shared exclusively by the application module and the audio module, wherein the session policy is further to exclude other modules or components of the computing device from accessing data being communicated between the preconfigured memory space being shared by the application module and the audio module,
wherein the session policy is further to define one or more of integrity parameters, cryptography parameters, and replay parameters, wherein the other modules or components include one or more of an operating system, system software, kernels, drivers, and middleware;

transmitting, by the application module of the computing device, the session policy to the audio module based on the cryptographically secured communication with the audio module; and capturing, by the audio module of the computing device, audio through one or more microphones, encrypting the audio in accordance with the session policy, and transmitting the encrypted audio to the application module in compliance with the cryptographically secured communication.

9. The method of claim 8, further comprising verifying, by the computing device, trustworthiness of the application module based on whether the application module is executing in a trusted execution environment.

10. The method of claim 8, further comprising facilitating, at least partially, by the computing device, exchange of one or more cryptographic keys between the application module and the audio module.

11. The method of claim 8, further comprising:
receiving, by the application module of the computing device, the encrypted audio from the audio module;
decrypting, by the application module of the computing device, the audio in accordance with the session policy; and
processing, by the application module of the computing device, the decrypted audio.

12. The method of claim 8, wherein the session policy comprises one or more cryptographic policy rules to govern encryption and decryption of the audio communicated between the audio module and the application module, wherein the cryptographic policy rules are further to ensure one or more of secrecy, integrity, authentication, and playback protection of the audio, wherein a request to establish the cryptographically secured communication between the audio module and the application module includes determining that the request is in agreement with the session policy.

13. The method of claim 8, further comprising:
securely transmitting one or more secret keys in support of the session policy to the application module and the audio module.

14. At least one non-transitory machine-readable medium comprising instructions which, when executed by a data processing device, cause the data processing device to perform operations comprising:
establishing cryptographically secured communication between an application module and an audio module of the data processing device, wherein a session policy to dictate parameters of operations of and communication between the application module and the audio module, wherein the session policy is further to secure a preconfigured memory space to be shared exclusively by the application module and the audio module, wherein the session policy is further to exclude other modules or components of the processing device from accessing data being communicated between the preconfigured memory space being shared by the application module and the audio module,
wherein the session policy is further to define one or more of integrity parameters, cryptography parameters, and replay parameters,
wherein the other modules or components include one or more of an operating system, system software, kernels, drivers, and middleware;
transmitting, by the application module of the processing device, the session policy to the audio module based on the cryptographically secured communication with the audio module; and
capturing, by the audio module of the processing device, audio through one or more microphones, encrypt the audio in accordance with the session policy, and transmit the encrypted audio to the application module in compliance with the cryptographically secured communication.

15. The machine-readable medium of claim 14, wherein the operations further comprise verifying trustworthiness of the application module based on whether the application module is executing in a trusted execution environment.

16. The machine-readable medium of claim 14, wherein the operations further comprise facilitating, at least partially, exchange of one or more cryptographic keys between the application module and the audio module.

17. The machine-readable medium of claim 14, wherein the operations further comprise:
receiving, by the application module, the encrypted audio from the audio module;
decrypting, by the application module, the audio in accordance with the session policy; and
processing, by the application module, the decrypted audio.

18. The machine-readable medium of claim 14, wherein the session policy comprises one or more cryptographic policy rules to govern encryption and decryption of the audio communicated between the audio module and the application module, wherein the cryptographic policy rules are further to ensure one or more of secrecy, integrity, authentication, and playback protection of the audio, wherein a request to establish the cryptographically secured communication between the audio module and the application module includes determining that the request is in agreement with the session policy.

19. The machine-readable medium of claim 14, wherein the operations further comprise:
securely transmitting one or more secret keys in support of the session policy to the application module and the audio module.

* * * * *